(No Model.)
W. S. FELTON.
PLOW ATTACHMENT.
No. 332,652. Patented Dec. 15, 1885.
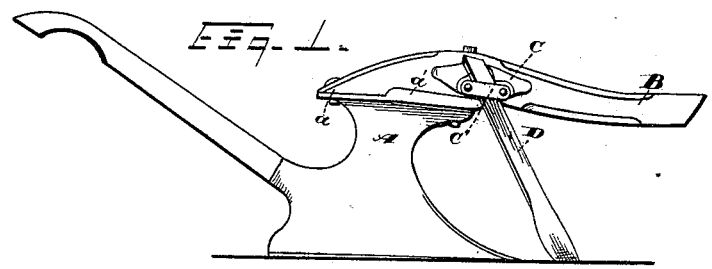
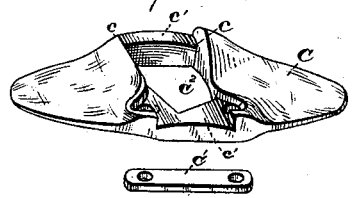
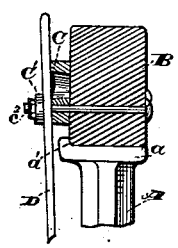 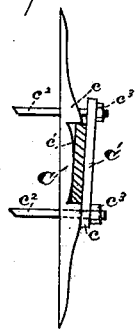 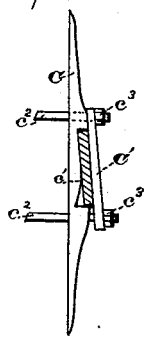
WITNESSES
INVENTOR

United States Patent Office.

WALTER S. FELTON, OF NORTH FAIRFIELD, OHIO, ASSIGNOR TO THE NORTH FAIRFIELD PLOW COMPANY, OF SAME PLACE.

PLOW ATTACHMENT.

SPECIFICATION forming part of Letters Patent No. 332,652, dated December 15, 1885.

Application filed August 27, 1885. Serial No. 175,477. (No model.)

*To all whom it may concern:*

Be it known that I, WALTER S. FELTON, of North Fairfield, in the county of Huron and State of Ohio, have invented certain new and useful Improvements in Plow Attachments; and I do hereby declare the following to be a full, clear, and exact description of the invention, such as will enable others skilled in the art to which it pertains to make and use the same.

My invention relates to improvements in plow attachments designed for holding a colter or jointer, in which a metal plate is secured to the side of the plow-beam, said plate having shoulders between which the colter or jointer shank is held, and a convex face and strap between which the shank of the colter or jointer may be adjusted to bring such tool in line with the plow.

In the accompanying drawings, Figure 1 is a side elevation of a plow, showing my improvements attached. Fig. 2 is an enlarged view in perspective of the plate C. Fig. 3 is a view in perspective of the plate C'. Fig. 4 is a transverse section on the line of $x\ x$, Fig. 1. Figs. 5 and 6 are horizontal sections showing the jointer at different inclinations to the line of the plow-beam.

The plow-standard A has a broad lateral flange, $a$, to which the beam B is bolted, said flange usually having an upwardly-projecting rib, $a'$, on one side, against which in erecting the plow the beam is placed to bring it in line.

C is a plate, usually of cast-iron, that is bolted to the side of the plow-beam on the landside of the plow. This plate has shoulders $c$, for embracing the shank D of a jointer or colter, and the seat between these shoulders, against which the shank D rests, is convex or crowning a trifle, as shown at $c'$, Figs. 5 and 6. The bolts $c^2$, that pass through the plow-beam and through the plate C, extend also through the cross-bar C' and form a clamp for holding the shank D. An opening, $C^2$, is usually left in the central part of the plate C to save metal and to bring the bearing of the shank at the top and bottom for holding it more firmly as against lateral pressure. The bolts $c^2$ are provided with nuts $c^3$, by loosening one of which and screwing up the other bolt the shank D is tilted and brought in line with the plow, or made to line toward or from the landside. For instance, if the forward bolt were loosened and the rear bolt tightened, the shank D might be brought in the position shown in Fig. 5, while by loosening the rear bolt and tightening the forward bolt the shank D might be brought to the position shown in Fig. 6, and any adjustment between these extremes is easily had.

I have chosen to illustrate my improved device in connection with a plow on which I have been in the habit of attaching the same; but the device is equally well adapted to other plows, and consequently I do not wish to be understood as limiting my invention to the particular plow shown, but claim it for all kinds of plows to which it is applicable.

What I claim is—

A plow attachment for holding a colter, jointer, or similar implement, consisting, essentially, of a plate, the inner face of which is constructed to rest solidly against the plow-beam, and the outer face thereof provided with the convex bearings $c'$, located, respectively, near the upper and lower edges thereof, shoulders formed on the outer face of said plate for engaging the front and rear edges of the colter-standards, and bolt-holes formed through said plate, a cross-bar for engaging the outer face of the colter or jointer shank, and bolts for holding the cross-bar in position.

In testimony whereof I sign this specification, in the presence of two witnesses, this 30th day of July, 1885.

WALTER S. FELTON.

Witnesses:
FRED A. YOUNG,
L. AMSDEN.